United States Patent
Hansen et al.

(10) Patent No.: US 8,602,688 B2
(45) Date of Patent: Dec. 10, 2013

(54) METHOD TO STOP WELLBORE FLUID LEAKAGE FROM A SPOOLABLE WELLBORE INTERVENTION ROD

(75) Inventors: Henning Hansen, Alicante (ES); Kaj Stokkeland, Sirevåg (NO)

(73) Assignee: Ziebel AS, Tananger (NO)

( * ) Notice: Subject to any disclaimer, the term of this patent is extended or adjusted under 35 U.S.C. 154(b) by 164 days.

(21) Appl. No.: 13/132,631

(22) PCT Filed: Nov. 24, 2009

(86) PCT No.: PCT/NO2009/000402
§ 371 (c)(1),
(2), (4) Date: Aug. 16, 2011

(87) PCT Pub. No.: WO2010/064920
PCT Pub. Date: Jun. 10, 2010

(65) Prior Publication Data
US 2011/0299933 A1   Dec. 8, 2011

Related U.S. Application Data

(60) Provisional application No. 61/119,389, filed on Dec. 3, 2008.

(51) Int. Cl.
*F16L 55/18* (2006.01)
(52) U.S. Cl.
USPC ..................................... 405/184.1; 166/387

(58) Field of Classification Search
USPC .................... 405/184.1, 184.2; 166/385, 387
See application file for complete search history.

(56) References Cited

U.S. PATENT DOCUMENTS

| | | | |
|---|---|---|---|
| 3,836,695 A * | 9/1974 | Strecker et al. | 174/23 C |
| 4,417,625 A | 11/1983 | Henson et al. | |
| 4,627,471 A | 12/1986 | Parkes et al. | |
| 4,872,253 A | 10/1989 | Carstensen | |
| 5,318,805 A | 6/1994 | Wu | |
| 5,495,755 A | 3/1996 | Moore | |
| 5,809,916 A | 9/1998 | Strand | |
| 5,848,656 A | 12/1998 | Moksvold | |
| 2008/0264651 A1 | 10/2008 | Alie et al. | |
| 2009/0266537 A1 | 10/2009 | Hansen et al. | |

FOREIGN PATENT DOCUMENTS

WO   WO2006/003477 A2   1/2006

\* cited by examiner

*Primary Examiner* — Tara M. Pinnock
(74) *Attorney, Agent, or Firm* — Gablegotwals

(57) ABSTRACT

A method for sealing a conduit in a spoolable wellbore intervention rod includes exposing an interior of the conduit at a location proximate the earth's surface while the spoolable rod is deployed in a wellbore. A curable sealing compound is introduced into the exposed interior of the conduit and the compound is allowed to cure.

9 Claims, 4 Drawing Sheets

US 8,602,688 B2

METHOD TO STOP WELLBORE FLUID LEAKAGE FROM A SPOOLABLE WELLBORE INTERVENTION ROD

CROSS-REFERENCE TO RELATED APPLICATIONS

This application is the United States National Phase of PCT Patent Application No. NO2009/000402 filed on 24 Nov. 2009, which was published in English on 10 Jun. 2010 under Publication No. WO 2010/064920 A1, which claims priority to U.S. Provisional Patent Application No. 61/119, 389 filed 3 Dec. 2008, both of which are incorporated herein by reference.

BACKGROUND OF THE INVENTION

1. Field of the Invention

The invention relates generally to the field of wellbore intervention using spoolable rods or tubes. More specifically, the invention relates to methods for sealing leaks in such rods or tubes while the rod or tube is disposed in a wellbore.

2. Background Art

In the extraction of oil and gas from underground reservoirs, it is frequently necessary to insert tool strings into a wellbore drilled through the reservoir to perform various completion and recompletion tasks.

There is known in the art a semi-stiff (stiff being defined in terms of bending moment), spoolable intervention rod having one or more internal fluid conduits and/or electrical and optical conductors. Such rod is used to provide wellbore intervention services under the name ZIPLOG, with is a mark of Ziebel, AS, the assignee of the present invention. A breakage or leak in the conduit in the spoolable rod below the surface (wellhead) can cause wellbore fluids and/or gas to migrate to the Earth's surface where the fluids can cause a safety hazard. The same gas and/or fluid migration may occur through the rod if seals on a guide nose coupled to the lower end of the rod fail to seal, or this guidenose is broken off the rod downhole.

Systems are being currently being developed and introduced for wellbore intervention for deployment of sensors, where the sensors can be incorporated into one of the foregoing semi-stiff, spoolable rod. The rod can be pushed into wellbores that are in operation (i.e. producing or injecting fluid), where the stiffness of the "rod" enables long lateral displacement to be achieved. Henning Hansen et al. describe a methodology for such a spoolable rod system in International Patent Application Publication No. WO 2006/003477 entitled "Intervention rod". The foregoing described rod is the same as that used to provide the previously stated ZIPLOG services.

Also there are systems known in the art that are based on pushing a spoolable, small diameter tubing associated with the rod into wellbores for purposes such as chemical injection, as for example, for gas well dewatering. See, e.g., U.S. Patent Application Publication No. 2009/0266537 filed by Hansen et al., and which is commonly owned with the present invention.

In case of breakage or leakage downhole (below the Earth's surface) of such a rod or a small diameter tube, gas or wellbore fluids can migrate to surface where they can become a safety hazard. Spoolable rod and small diameter tube systems normally have one or several pressure barriers implemented in the lower end of the rod or tube being inserted into the wellbore, but the challenge is if there is a leakage within these barriers or leakage or breakage in the rod or tube above these barriers.

Typically a pressure seal, as for example in the form of a valve, can be coupled to the upper end of the "rod" or tube, located outside the wellhead as for example on a surface winch unit, but this is in many instances not sufficient barrier to obtain sufficiently safe wellbore operations with contingency built in.

SUMMARY OF THE INVENTION

A method for sealing a conduit in a spoolable wellbore intervention rod includes exposing an interior of the conduit at a location proximate the Earth's surface while the spoolable rod is deployed in a wellbore. A curable sealing compound is introduced into the exposed interior of the conduit. The compound is allowed to cure.

Other aspects and advantages of the invention will be apparent from the following description and the appended claims.

DETAILED DESCRIPTION

Figure 1:
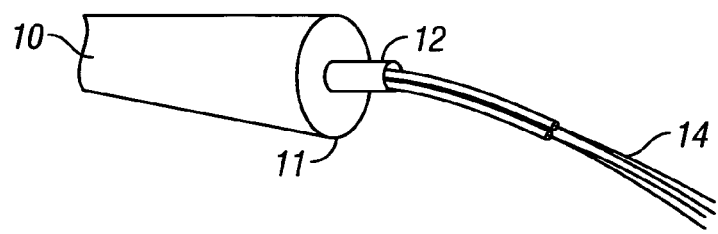
FIG. 1 is a cut away view of a spoolable, fiber rod including a conduit and optical fibers therein.

FIG. 1 illustrates a semi-stiff, spoolable wellbore intervention "rod" 10 that has been developed (e.g., as used with the ZIPLOG service explained in the Background section herein) to be pushed into producing wellbores for well logging purposes and other wellbore operations. The rod 10 generally consists of an exterior of fiber reinforced plastic 11, and may be generally cylindrically shaped as shown in FIG. 1. As can also be observed in FIG. 1, there is typically a small steel tube or conduit 12 disposed generally in the center of the rod 10. The tube 12 or other portion of the interior of the rod 10 may contain fiber optic and/or electrical cable(s). See 10A through 1D in FIG. 2. The issue addressed by the present invention is wellbore fluid or leakage through, for example, the conduit 12 to the Earth's surface if part of the spoolable rod becomes damaged or broken in the wellbore. In such cases, the wellbore fluid can enter the interior of the spoolable rod's tube 12 and migrate to the Earth's surface. As will be explained with reference to FIGS. 4 and 5, if the spoolable rod 10 passes through the sealing devices in a wellhead system, the conduit 12 may provide in a fluid conduit through the wellhead in the event of such breakage or damage. Such situation can present safety hazards.

Figure 1A:
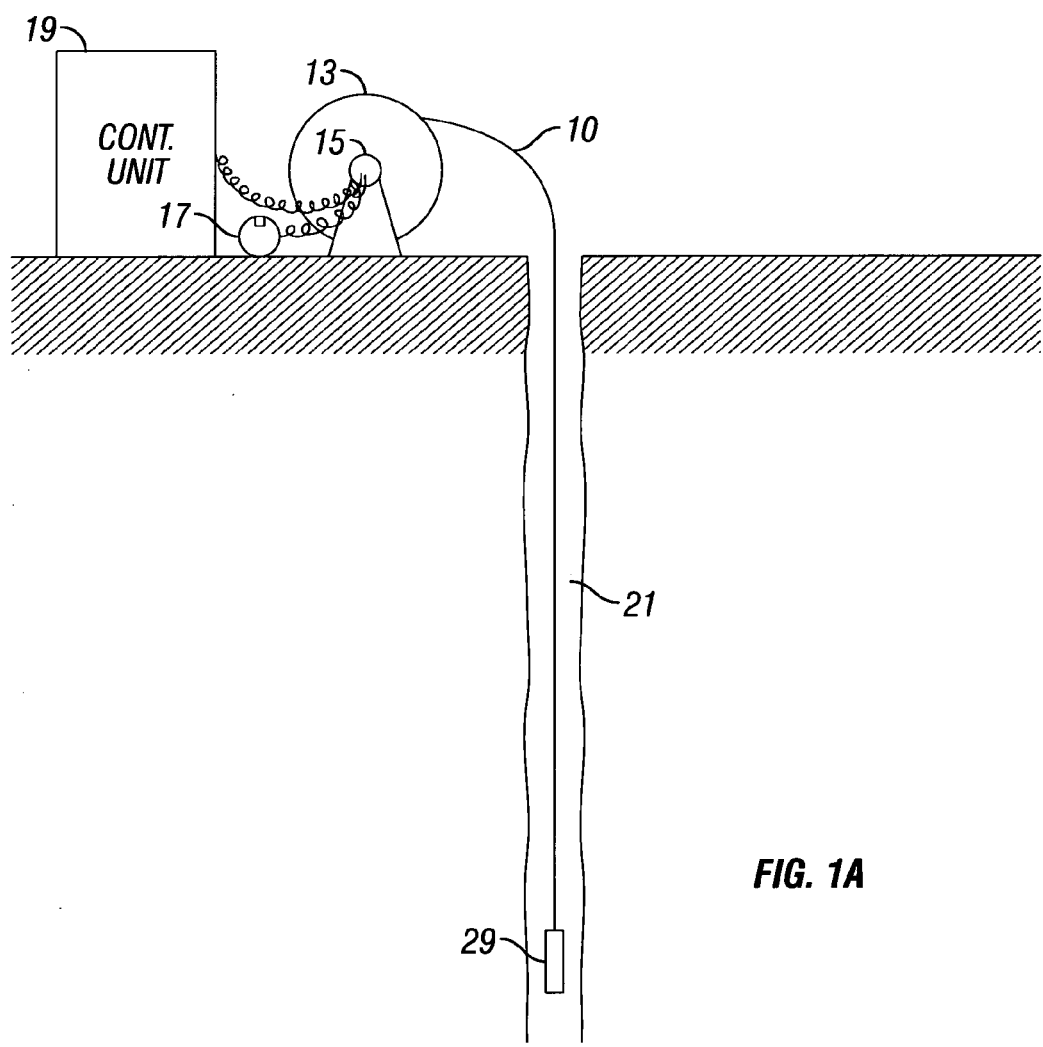
FIG. 1A shows using the spoolable rod in a wellbore.

A typical wellbore intervention operation using the spoolable rod 10 of FIG. 1 is shown in FIG. 1A. The rod 10 may be unspooled from a winch 13 or similar device into a wellbore 21 drilled through the subsurface. The tube 12, electrical cables, and optical fibers (see FIG. 1) in the rod 10 may terminate in a slip ring 15 or similar device to enable rotation of the winch 13 to extend and retract the rod 10 from a wellbore 21 drilled through the subsurface. Electrical and/or optical connections may be made from the slip ring 15 to a control unit 19 which may include devices for decoding and recording signals from the rod, and may include controls to operate the winch 15. The tube (12 in FIG. 1) may be hydraulically coupled to a pump 17 for moving fluid through the conduit (12 in FIG. 1) or similar device. Thus, while the rod 10 is in the wellbore, a sealing fluid may be pumped into the rod toward a guide nose or tool 29 coupled to the bottom end of the rod.

The intervention rod 10 shown in cut away view FIG. 1 is only one example of a wellbore intervention rod that may be used in accordance with the invention. Other examples include steel or composite tubes, which may include electrical conductors, hydraulic lines and/or optical fibers in the interior thereof. The principle of the invention is applicable to any type of wellbore intervention rod or conduit that would introduce a fluid path to the surface if the rod or conduit was exposed on its interior to fluid pressure in the wellbore below the Earth's surface or wellhead.

Figure 2:
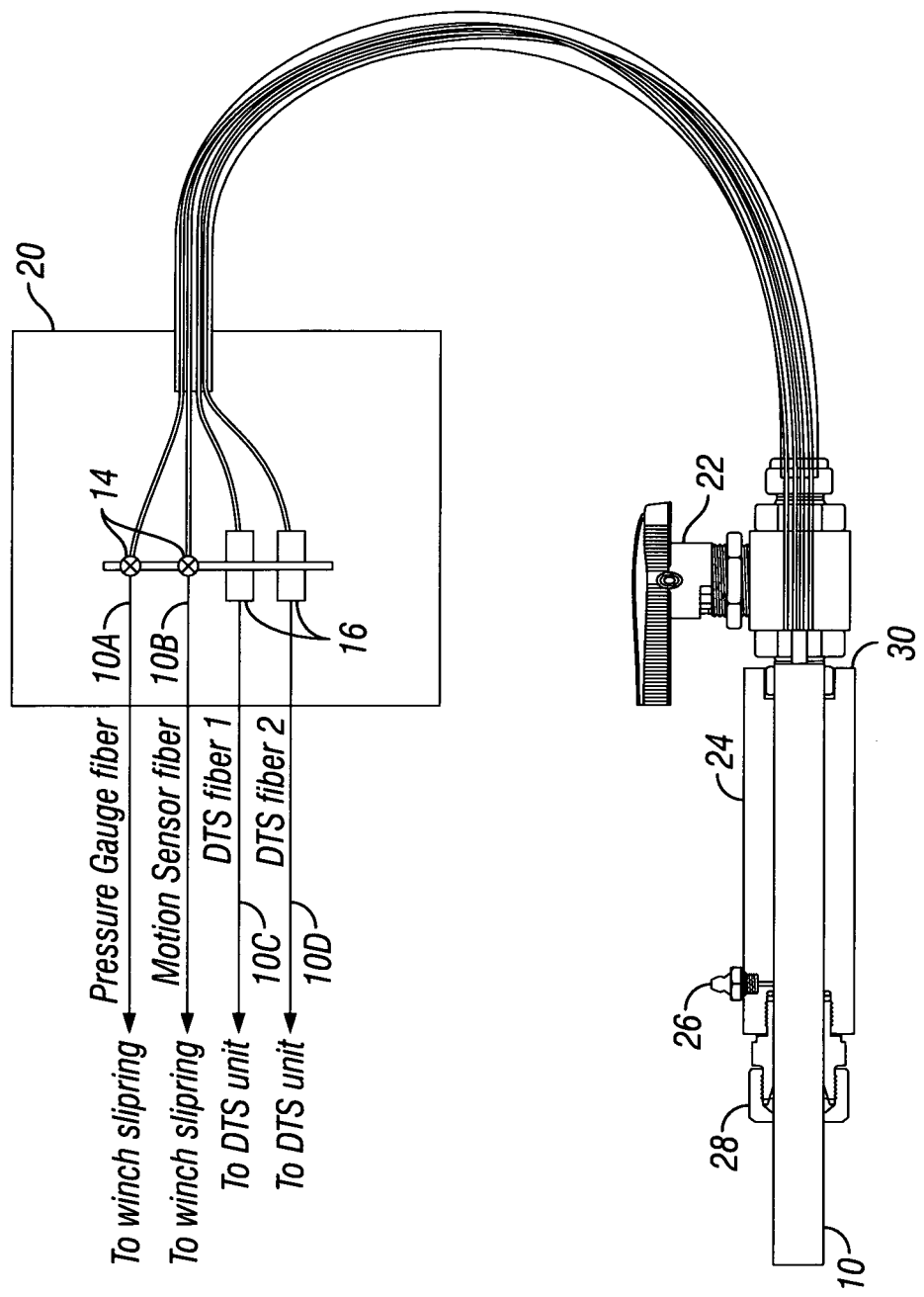
FIG. 2 shows a valve that may be used to hydraulically shut off the interior of a rod according to FIG. 1.

FIG. 2 illustrates how a valve such as a ball valve 22 can be mounted at the Earth's surface between the spoolable rod 10 and a junction box, slip-ring or similar device, shown generally at 20. The valve 22 is sealingly engaged to the end of the rod 10 nearest a slip ring junction box 20 and can be used stop any wellbore fluids (e.g., gas, oil and/or water) from flowing through the tube to the surface environment. The junction box provides suitable terminations for the ends of optical fibers 10A, 10B, 10C, 10D and may use optical connectors 16 before the conductors or fibers are communicated to the slip ring (15 in FIG. 1A). The seal can consist of a sleeve 24 having internal diameter to enable movement of the rod 10 therethrough. One end of the tube 24 may be threadedly engaged to a mating, sealing threaded connection 30 on the valve 20. The other end of the tube 24 may be sealed to the rod by a compression union 28 or similar device. A hydraulic fitting 26 enables pumping sealant into the interior of the tube 24. In the event any wellbore fluid leakage occurs into the interior of the rod 10, the valve 22 may be closed to prevent further upstream movement of the fluid. Preferably the valve 22 is suitably configured be able to cut the tube, cables, lines or optical fibers within such tube. When the valve is closed, fluid discharge from the well will be stopped.

Figure 3:
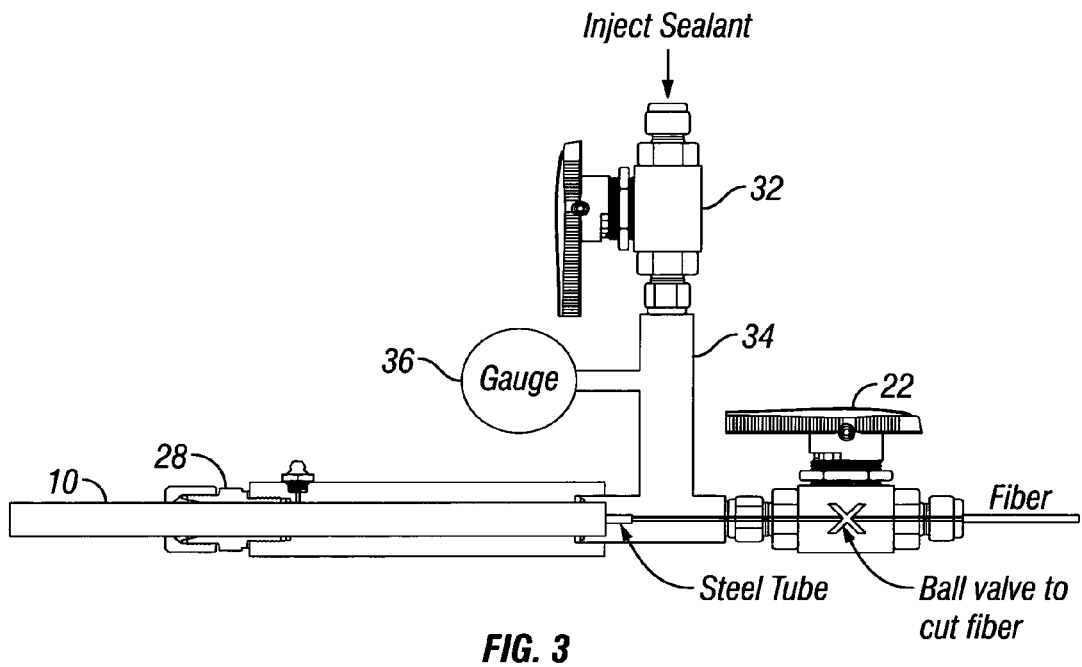
FIG. 3 shows a side valve used in connection with the shut off valve of FIG. 2, where the side valve can be used to inject sealant material into the inner tube of the rod.

FIG. 3 is similar to FIG. 2, but includes an inlet port (T-fitting 34) downstream (in the direction of the wellbore) of the valve 22 (also shown in FIG. 2) and used to inject a plugging or sealing compound (which can be resin material, epoxy, fluidized elastomer and similar curable sealing materials) into the tube in the spoolable rod. The sealing material may be pumped through a valve 32 and the injection pressure measured by a gauge 36 to determine when sealant injection should be stopped, as for example, by measuring a substantial increase in pressure while sealant flow remains constant. Also this gauge 36, will, prior to injecting sealant provide information about fluid and/or gas leakage to surface and the pressure response of such. As explained above, the fiber optic and/or electrical cable(s) in the tube 24 can be cut by the valve 22 coupled between the inlet port system and a slip-ring or junction box.

When the above operation has been performed, the winch and control unit may be removed from the area of the wellbore (21 in FIG. 1), and the rod (10 in FIG. 1) can be left for extended periods of time in the wellbore without any wellbore fluid or gas leakage to surface. Alternatively, the rod 10 can be pulled out of the wellbore (21 in FIG. 1) in a controlled fashion.

Figure 4:
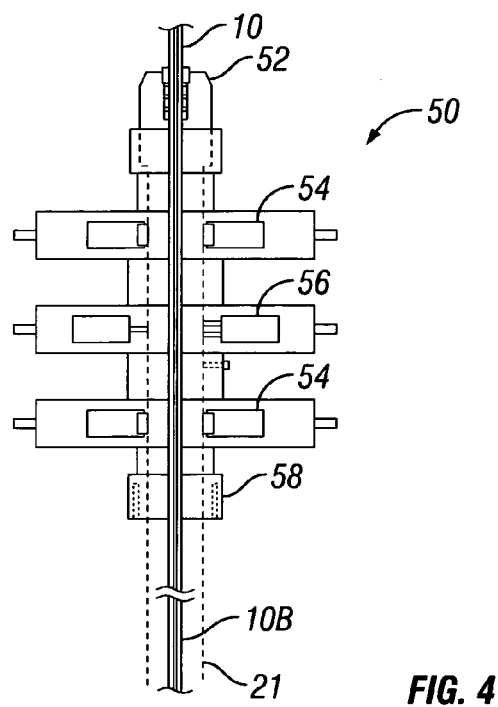
FIG. 4 shows using a blow-out preventer (also referred to as a BOP) and lubricator stack with a rod according to FIG. 1.

FIG. 4 illustrates a typical surface rig-up for wellbore interventions, where a pressure control device called a "blow out preventer" (BOP) 50 is mounted on top of a wellhead. The wellhead (not shown in FIG. 4 for clarity) may include a "christmas tree" or similar surface valve arrangement known in the art. The uppermost section of the BOP typically includes a "pack-off" or "lubricator" 52 system to provide an external seal to the rod 10 or tube deployed into the wellbore. The BOP 50 typically includes two hydraulically actuated rams 54 that when closed for a seal against the exterior of the rod 10. The BOP may also include one or more "shear rams" 56 that when closed completely cut through and sever the rod 10 or tube within. The BOP stack 50 is generally coupled to the wellhead (not shown) by a flange type coupling 58. FIG. 4 also shows the pressure barrier challenge created by a broken or leaking "rod" or tube (at 10B) where the leak is below the BOP.

Protruding out of the pack-off or lubricator 52 at the upper end of the wellhead is the "rod" or tube, which is typically deployed by a winch system or similar device (See, e.g., FIG. 1) where the above described (with reference to FIGS. 2 and 3) system can be mounted. If no spooler system is in place, the "rod" or tube may be routed to a connection point away from the wellhead system.

Figure 5:
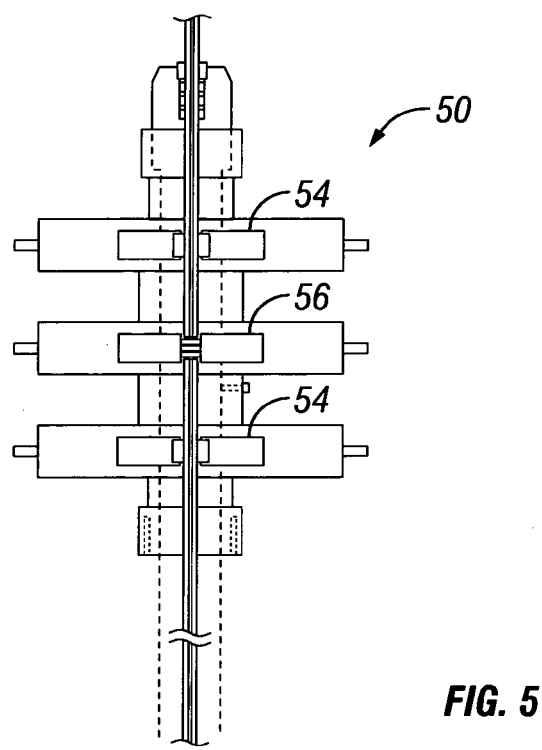
FIG. 5 shows the first part of a second method to seal the interior of a leaking rod or tube, where the rod is cut by the BOP shear ram.
Figure 6:
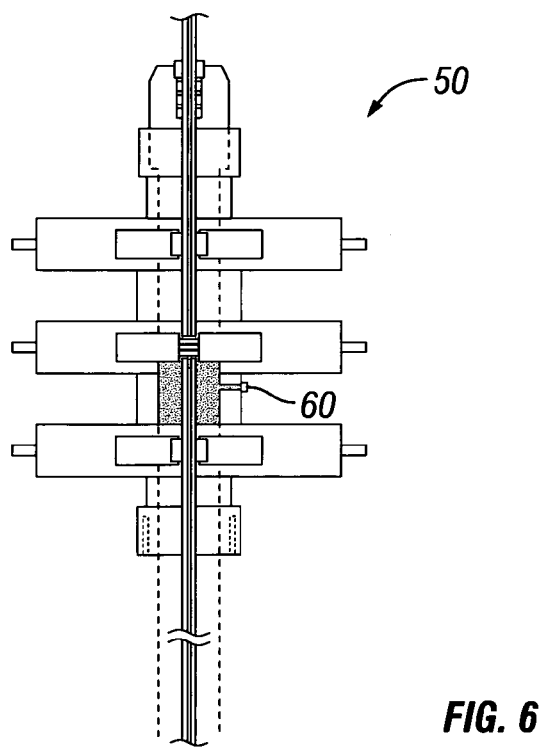
FIG. 6 shows the second part of the second method procedure shown in FIG. 5, where plugging compound is injected into a rod cut according to FIG. 5.

FIG. 5 illustrates how an internally leaking "rod" 10 or tube can be sealed off externally in a BOP system 50. First, the seal rams 54 will be closed against the rod, followed by closure of the shear rams. This will expose the interior of the rod 10 to fluid pressure in the space between the two seal rams 54. FIG. 6 illustrates how sealing compound, examples of which are stated above, can be injected at high pressure through an inlet 60 between the lower seal ram and the shear ram of the BOP system 50. The wellbore fluids in the area between these two rams can be evacuated prior to performing such injection by a second port. Also such fluids can be displaced by the plugging compound, by controlled evacuation of such through a second port (not shown) by pumping in sealing compound into port 60. When the sealing compound reaches the exposed and cut end of the "rod" or tube 10, continued pumping of compound into the BOP port 60 will force such compound into the "rod" or tube 10, whereafter the compound will cure and seal off the internal of this "rod" or tube. At such time, the upper seal ram may be opened and the cut end of the tube may be removed from the BOP 50 and lubricator 52. The remaining portion of the rod 10 may remain sealed in the lower seal ram as long as is necessary to prepare the well for ultimately removing the rod therefrom.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A method for sealing an interior of at least one tube (12) disposed within a semi-stiff, spoolable wellbore intervention rod (10) including a spoolable fiber exterior structure (11), said method comprising the following steps of:
   exposing an interior of said at least one tube (12) at a location proximate the earth's surface while the spoolable intervention rod (10) is deployed in a wellbore (21);

securing the intervention rod (10) in a blow-out preventer (50) mounted on top of a wellhead by closing at least two spaced apart pipe rams onto an exterior of the intervention rod (10);

injecting a curable sealing compound though an inlet located between the at least two spaced apart pipe rams;

allowing the compound to cure to form a seal; and cutting the intervention rod (10) by closing one or more rams (54) having cutting means.

2. The method of claim 1 further comprising pumping the curable compound through a valve (22) disposed along the intervention rod (10) above the earth's surface.

3. The method of claim 1 further comprising removing a portion of the intervention rod (10) above the wellbore (21) and leaving the remainder of the rod (10) in the wellbore (21).

4. The method of claim 1 further comprising removing the intervention rod (10) from the wellbore (21).

5. The method of claim 1 wherein the exterior structure (11) consists of fiber reinforced plastic.

6. A method for sealing an interior of at least one tube disposed within a semi-stiff, spoolable wellbore intervention rod including a spoolable fiber exterior structure, said method comprising the following steps:

mounting a valve with cutting means at the earth's surface between the intervention rod and a junction box;

sealably engaging the valve to the end of the intervention rod by use of a tube having an internal diameter and having one end with threads for engaging the valve and another end for sealing to the intervention rod by a compression union, the tube further having a fitting for receiving curable sealing compound;

injecting the curable sealing compound into the interior of the tube through the fitting;

closing the valve to prevent upstream movement of the fluid; and cutting the tube.

7. The method according to claim 6 including injecting the curable sealing compound into the tube via an inlet port assembly located downstream of the valve, the inlet port assembly comprising a valve and a pressure gauge.

8. The method according to claim 6 including leaving the intervention rod in the wellbore for a predetermined period of time without any fluid or gas leaking to the surface.

9. The method according to claim 6 including removing the invention rod from the wellbore.

\* \* \* \* \*